US012680348B2

(12) United States Patent
Su

(10) Patent No.: US 12,680,348 B2
(45) Date of Patent: Jul. 14, 2026

(54) COMBINATION LOCK FOR ELECTRONIC PRODUCT

(71) Applicant: INGAMAR CO., LTD., Changhua (TW)

(72) Inventor: Jason Su, Changhua (TW)

( * ) Notice: Subject to any disclaimer, the term of this patent is extended or adjusted under 35 U.S.C. 154(b) by 2 days.

(21) Appl. No.: 18/911,010

(22) Filed: Oct. 9, 2024

(65) Prior Publication Data

US 2026/0098430 A1 Apr. 9, 2026

(51) Int. Cl.
*E05B 73/00* (2006.01)
*E05B 37/02* (2006.01)

(52) U.S. Cl.
CPC .......... *E05B 73/0082* (2013.01); *E05B 37/02* (2013.01); *E05B 73/0005* (2013.01)

(58) Field of Classification Search
CPC ............. E05B 73/0005; E05B 73/0082; E05B 67/003; E05B 37/02; E05B 37/025; Y10S 292/37; Y10T 292/1031; Y10T 70/40; Y10T 70/5009; Y10T 70/483
See application file for complete search history.

(56) References Cited

U.S. PATENT DOCUMENTS 212,661 A * 2/1879 Condon .................. E05B 63/20 292/153
1,036,583 A * 8/1912 Diedrich ............... E05B 65/025 292/153
1,240,146 A * 9/1917 Jackson .............. E05B 15/0046 70/30
4,826,224 A * 5/1989 Lee ....................... F24C 15/022 292/25
6,058,744 A * 5/2000 Ling ..................... E05B 37/025 70/312
6,619,080 B1 * 9/2003 Yu ....................... E05B 73/0005 70/58
6,619,081 B1 * 9/2003 Yu ....................... E05B 73/0005 70/58
8,671,721 B2 * 3/2014 Yu ......................... E05B 37/025 70/424
11,203,885 B2 * 12/2021 Su ....................... E05B 73/0005
11,359,406 B2 * 6/2022 Su ....................... E05B 73/0082
11,933,077 B2 * 3/2024 Su ....................... E05B 73/0005
(Continued)

FOREIGN PATENT DOCUMENTS

WO WO-0242586 A1 * 5/2002 ......... E05B 73/0082

*Primary Examiner* — Carlos Lugo
(74) *Attorney, Agent, or Firm* — Che-Yang Chen; Law Office of Michael Chen

(57) ABSTRACT

A combination lock for electronic product may include a shell, a locking rod, a positioning member, and a locking member. The locking rod movably inserted within the shell, sequentially comprises a trigger block and a top column at one end thereof. The positioning member pivotally mounted within the shell to swing comprises at least two first engaging teeth on the upper surface of the positioning member. The locking member movably installed in the shell has two symmetrical engaging members pivotally connected at one end of the locking member, and each of the two engaging member comprises an engaging arm extending from one end of the engaging member out of the shell. The other ends of the two engaging members are driven by the locking rod to open/close the two engaging arms, thereby locking or unlocking an electronic device.

9 Claims, 7 Drawing Sheets

(56) References Cited

U.S. PATENT DOCUMENTS

| | | | | |
|---|---|---|---|---|
| 12,385,290 | B2 * | 8/2025 | Wang | E05B 73/0082 |
| 2007/0125138 | A1 * | 6/2007 | Miao | E05B 73/0082<br>70/58 |
| 2023/0228128 | A1 * | 7/2023 | Wang | E05B 73/0082<br>70/58 |

* cited by examiner

COMBINATION LOCK FOR ELECTRONIC PRODUCT

FIELD OF THE INVENTION

The present invention relates to a lock and more particularly to a combination lock for electronic product.

BACKGROUND OF THE INVENTION

With the rapid advancement of internet, portable electronic products, such as laptops and tablets, have become inseparable from people's daily life. Due to their lightweight design and high cost, the products are highly susceptible to theft or loss, typically, such devices are equipped with an anti-theft slot, where an anti-theft lock designed for electronic can be used. The lock features a mechanism that inserts into the anti-theft slot and secures it in place. By attaching the cable of lock to a fixed object, such as a table leg, the anti-theft lock can achieve the goal of securing and preventing theft of the device.

However, the conventional lock has following disadvantages: due to the vast variety of electronic products on the market, even devices from the same brand may have different specifications and shapes for their anti-theft slots. This forces consumer must purchase different anti-theft locks to match the specific slot specifications of their devices, making it difficult for traditional anti-theft locks to accommodate the diverse sizes of anti-theft slots available. Therefore, there remains a need for a new and improved design for a combination lock for electronic product to overcome the problems presented above.

SUMMARY OF THE INVENTION

The present invention provides a combination lock for electronic product comprising a shell, a locking rod, a positioning member, and a locking member. The shell is formed by combining two symmetrically arranged parts. The locking rod movably inserted within the shell, sequentially comprises a trigger block and a top column at one end thereof, and the locking rod axially penetrate through the shell to couple a control button in the shell, and the trigger block is abutted against and driven by the control button so as to move the locking rod. The positioning member pivotally mounted within the shell to swing comprises at least two first engaging teeth on the upper surface of the positioning member, and the lower surface of the positioning member is abutted against and pushed upwardly by a first spring to form a locked state of the positioning member in normally, and the positioning member is released and into an unlocked state by the control button. The locking member movably installed in the shell has two symmetrical engaging members pivotally connected at one end of the locking member, and each of the two engaging member comprises an engaging arm extending from one end of the engaging member out of the shell. The other ends of the two engaging members are driven by the locking rod to open/close the two engaging arms, thereby locking or unlocking an electronic device. At least two second engaging teeth are formed on the outer periphery of the locking member, and when the locking member is retracted toward the shell, the first engaging teeth of the positioning member are engaged with the second engaging teeth so as to adjust contact depth between the two engaging members and the top column, thereby achieving the adjustment of open distance of the two engaging arms. The other end of the locking member is normally pushed by a third spring, and when the positioning member is set to a released state through the control button, the locking member is adapted to be pushed back into its original position by the force of the third spring.

In one embodiment, the shell comprises a first chamber and a second chamber located adjacent to one end of the shell. The first chamber has one open end communicated with external environment, and a stop plate is formed at the other end of the first chamber. The stop plate has a first through hole on the center thereof, and one lateral side of the first chamber comprises an accommodating slot which is communicated with the first chamber. The second chamber has a second through hole at one side thereof to penetrate through the shell, and the second through hole and the accommodating slot are located on opposite sides of the shell. Moreover, a lower channel formed between the front end of the second chamber and the stop plate is adapted to connect and communicate the second chamber with the accommodating slot.

In another embodiment, a plurality of number wheels are disposed on one end of the locking rod, and the axial movement of the locking rod is controlled by the number wheels. The shell has a plurality third through holes to allow partial of the number wheels at corresponding positions to be exposed. The trigger block is slidably accommodated within the second chamber. The top column passes through the first through hole and the first chamber to penetrate out of the shell. The trigger block comprises a trigger slope, and the control button has a pressing slope and a first pressing portion is extended from the bottom end of the pressing slope. The control button is assembled through the second through hole of the shell into the second chamber. The pressing slope is configured to abut against and push the trigger slope of the trigger block, and the first pressing portion is moved along the lower channel into the accommodating slot. A first elongated hole axially penetrates through the control button to allow the top column to pass through the control button.

In still another embodiment, the positioning member is assembled in the accommodating slot, and the accommodating slot has an axial pin pivotally connected to the positioning member. An inclined slot is formed on the lower surface of the accommodating slot to secure a first spring. The first spring is adapted to abut against the lower surface of the positioning member, so that the first engaging teeth on the upper surface of the positioning member are normally extend upward into the first chamber and are abutted against the bottom end of the stop plate to secure the position thereof. A second pressing portion formed at the other end of the positioning member protrudes within the lower channel.

In a further embodiment, the locking member has a first assembly base and a second assembly base. The first assembly base has an axial through hole penetrating therethrough, and taking the axial through hole as the center, the first assembly base comprises two first pivot slots at one side of the center, and a peripheral groove at the other side of the first assembly base to receive and secure one end of a third spring, and the other end of the third spring is abutted against the stop plate. The second engaging teeth are formed on the outer periphery of the first assembly base. The second assembly base comprises a second elongated hole axially penetrating therethrough, and two second pivot slots are formed at one end of the second assembly base at the positions corresponding to the two first pivot slots. The engaging arms are adapted to penetrate through and out of the second elongated hole of the second assembly base, and the two second pivots slots and the two first pivot slots are aligned and coupled together to connect the two engaging members. The outer diameter of the first assembly base is larger than that of the second assembly base, and the first assembly base is limited in the first chamber. The second assembly base is configured to protrude out of the shell.

In still a further embodiment, a positioning pin is formed on one end of the first assembly base, and a positioning hole axially penetrate through the second assembly base, so that by aligning the positioning hole with the positioning pin, the first assembly base and the second assembly base are accurately fitted together.

In an advantageous embodiment, each of the engaging arms has a recess, and the two recess on the engaging arms are located at symmetrical positions, and an elastic ring is disposed on the recesses, so that the engaging arms of the engaging members are constrained by the elastic ring to move toward each other in normal state.

In another advantageous embodiment, the diameter of the top column is gradually expanded from the front end to form a first diameter segment, a second diameter segment, and a third diameter segment, and each of the engaging members has a driving protrude at the inner edge of the end opposite to the engaging arm, and the open distance between the two engaging arms is adjusted by moving the driving protrudes on different surfaces of the first diameter segment, the second diameter segment, and the third diameter segment.

In a preferred embodiment, a guiding slope is formed on the outward-facing surface of the first engaging tooth while a push slope is formed on the inward-facing surface of the second engaging tooth. When the locking member retracts, the push slope of the second engaging tooth is adapted to push the guiding slope of the first engaging tooth, so as to push the positioning member to tilt downward.

Comparing with conventional combination lock for electronic product, the present invention is advantageous because: (i) the retractable locking member allows the two engaging members to be moved inward so as to adjust the contact depth with the top column and the open distance between the two engaging arms, and after the locking member moves inward, the second engaging teeth are engaged with the first engaging teeth of the positioning member, thereby preventing the locking member springing back and ensuring that the opening distance of the two engaging arms remains secure, and further providing a clear indication of the adjustment state of the locking member; and (ii) the locking member is equipped with at least two second engaging teeth on the outer periphery thereof, corresponding to at least two first engaging teeth on the positioning member, allowing for at least three distinct adjustment settings, which makes the combination lock of the present invention to apply to a wide variety of hole sizes of different electronic devices, significantly enhancing its structural practicality and convenience.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
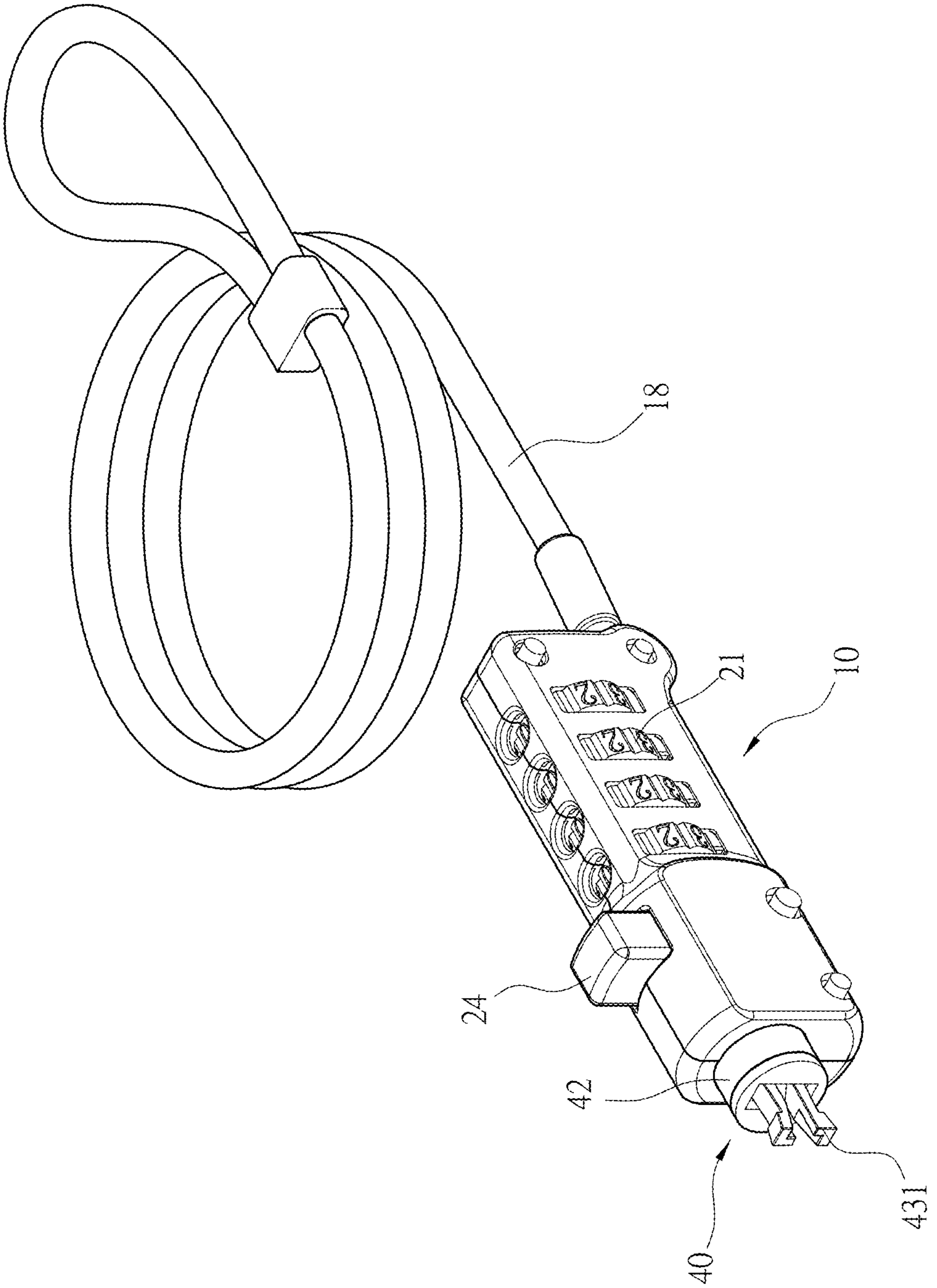
FIG. 1 is a three-dimensional assembly view of a combination lock for electronic product of the present invention.
Figure 2:
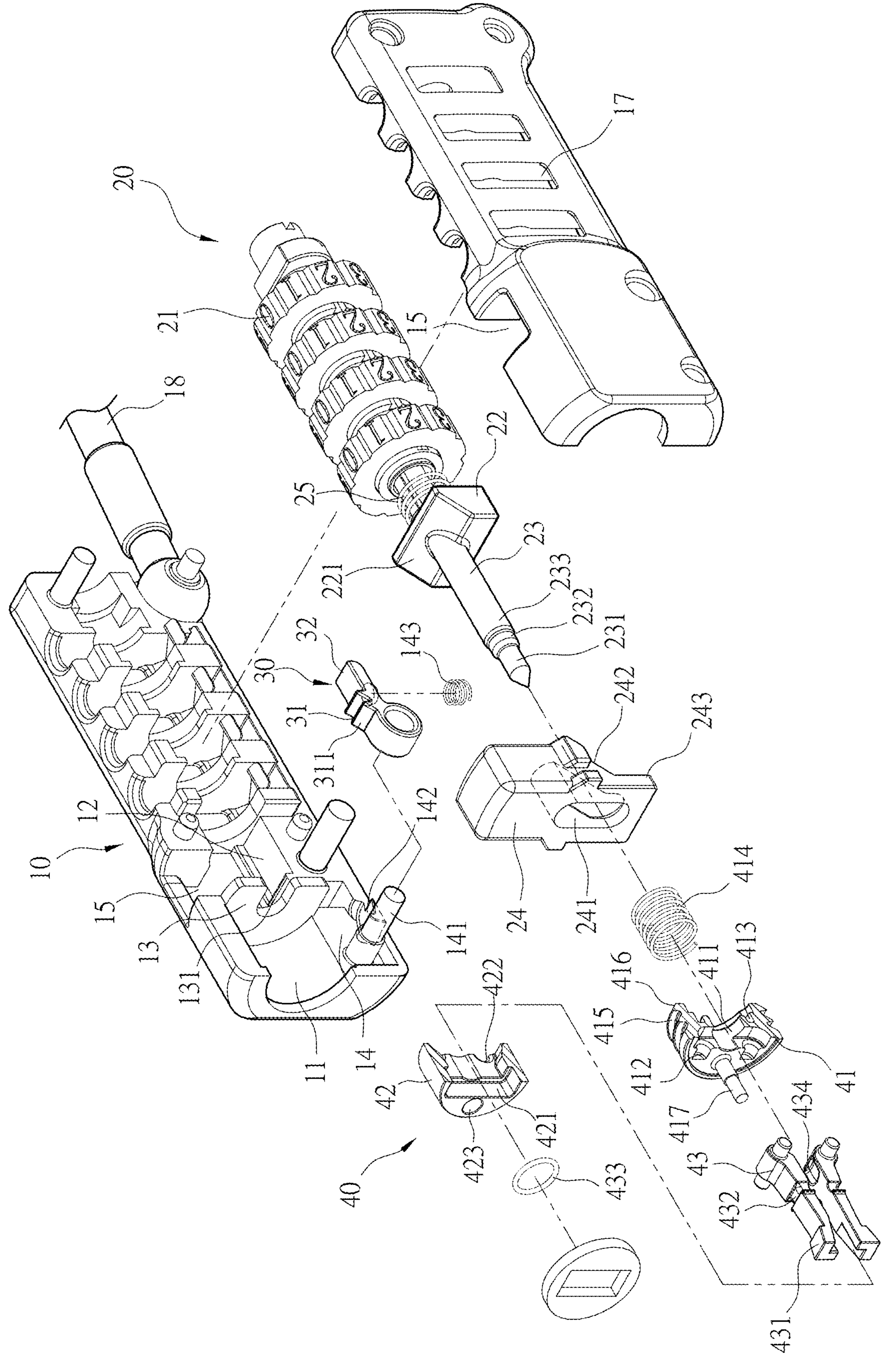
FIG. 2 is an exploded view of the combination lock for electronic product of the present invention.
Figure 3:
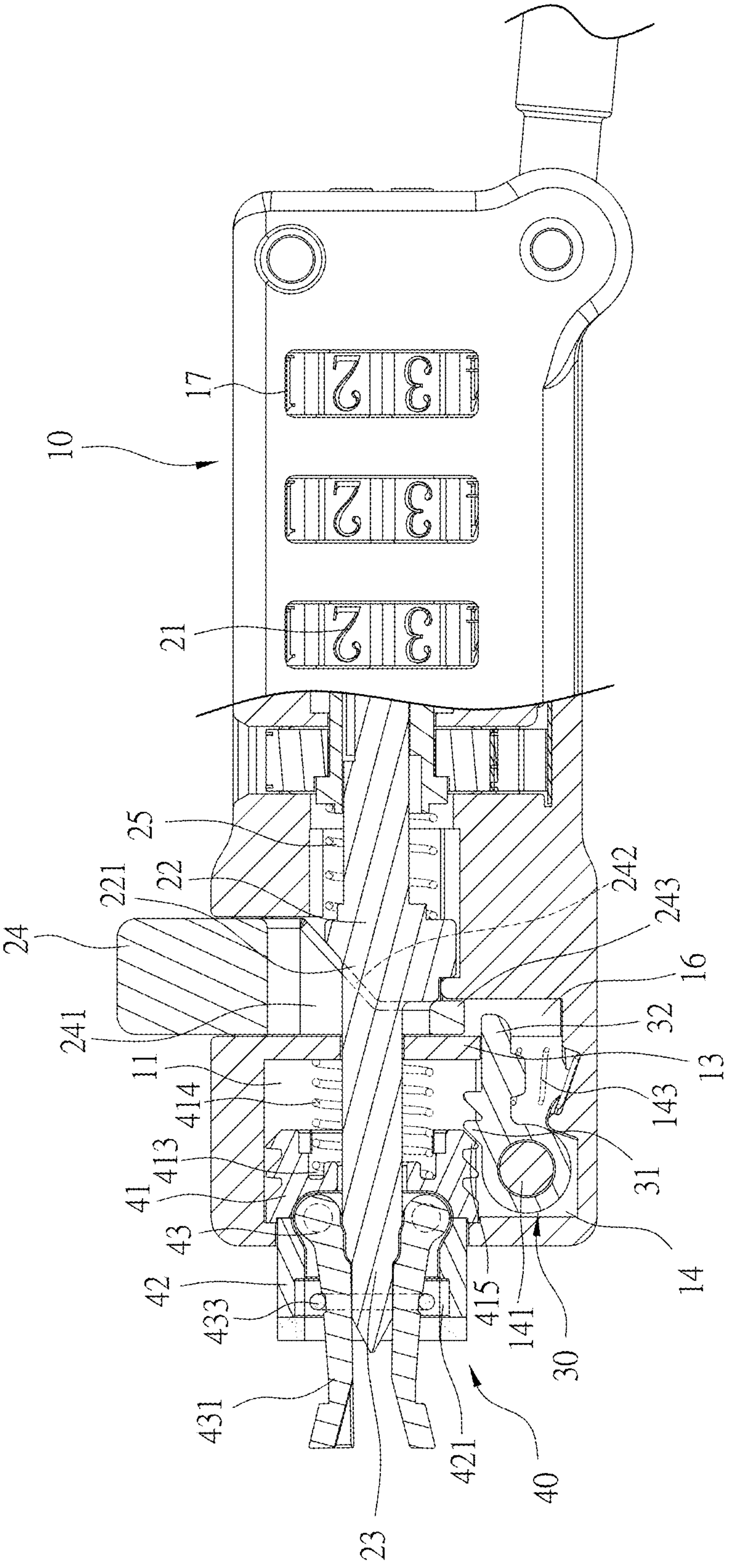
FIG. 3 is a partial sectional assembly view of the combination lock for electronic product of the present invention.

In order to further understand the goal, characteristics and effect of the present invention, a number of embodiments along with the drawings are illustrated as following:

Referring to FIGS. 1 to 3, the present invention provides a combination lock for electronic product comprising a shell (10), a locking rod (20), a positioning member (30), and a locking member (40).

The shell (10) is formed by combining two symmetrically arranged parts, and the shell (10) comprises a first chamber (11) and a second chamber (12) located adjacent to one end of the shell (10). The first chamber (11) has one open end communicated with external environment, and a stop plate (13) is formed at the other end of the first chamber (11). The stop plate (13) has a first through hole (131) on the center thereof, and one lateral side of the first chamber (11) comprises an accommodating slot (14) which is communicated with the first chamber (11). The second chamber (12) has a second through hole (15) at one side thereof to penetrate through the shell (10), and the second through hole (15) and the accommodating slot (14) are located on opposite sides of the shell (10). Moreover, a lower channel (16) formed between the front end of the second chamber (12)

and the stop plate (13) is adapted to connect and communicate the second chamber (12) with the accommodating slot (14).

The locking rod (20) is movably inserted within the shell (10), and a plurality of number wheels (21) are disposed on one end of the locking rod (20), and the axial movement of the locking rod (20) is controlled by the number wheels (21). The shell (10) has a plurality third through holes (17) to allow partial of the number wheels (21) at corresponding positions to be exposed. Furthermore, the locking rod (20) sequentially comprises a trigger block (22) and a top column (23) at one end thereof, and the trigger block (22) is slidably accommodated within the second chamber (12). The top column (23) is positioned between the first through hole (131) of the stop plate (13) and the first chamber (11), and the end of the top column (23) extends out of the shell (10). In addition, the trigger block (22) comprises a trigger slope (221), which is driven by a control button (24), and the control button (24) is assembled through the second through hole (15) of the shell (10) into the second chamber (12). A first elongated hole (241) axially penetrates through the control button (24) to allow the top column (23) to pass through the control button (24). Also, the control button (24) has a pressing slope (242) and a first pressing portion (243) is extended from the bottom end of the pressing slope (242). The pressing slope (242) is configured to abut against and push the trigger slope (221) of the trigger block (22) to move the locking rod (20), so as to drive the first pressing portion (243) along the lower channel (16) into the accommodating slot (14).

The positioning member (30) assembled in the accommodating slot (14) comprises at least two first engaging teeth (31) on the upper surface of positioning member (30), and the first engaging teeth (31) are faced to the first chamber (11). The accommodating slot (14) has an axial pin (141) pivotally connected to one end of the positioning member (30), and an inclined slot (142) is formed on the lower surface of the accommodating slot (14) to secure a first spring (143). The first spring (143) is adapted to abut against the lower surface of the positioning member (30), so that the first engaging teeth (31) on the upper surface of the positioning member (30) are normally extend upward into the first chamber (11) to form a locked state, and are abutted against the bottom end of the stop plate (13) to secure the position thereof. A second pressing portion (32) formed at the other end of the positioning member (30) protrudes within the lower channel (16), allowing the first pressing portion (243) of the control button (24) to press down, thereby forming a released state.

The locking member (40) has a first assembly base (41), a second assembly base (42), and two engaging members (43). The first assembly base (41) has an axial through hole (411) penetrating therethrough, and taking the axial through hole (411) as the center, the first assembly base (41) comprises two first pivot slots (412) at one side of the center, and a peripheral groove (413) at the other side of the first assembly base (41) to receive and secure a third spring (414). Furthermore, at least two second engaging teeth (415) are formed on the outer periphery of the first assembly base (41). The second assembly base (42) comprises a second elongated hole (421) axially penetrating therethrough, and two second pivot slots (422) are formed at one end of the second assembly base (42) at the positions corresponding to the two first pivot slots (412). Each of the engaging members (43) has one end assembled between the first pivot slot (412) and the second pivot slot (422), and an extended engaging arm (431) is formed at the other end of the engaging member (43). The engaging arms (431) are adapted to penetrate through and out of the second elongated hole (421) of the second assembly base (42), and the first assembly base (41) and the second assembly base (42) are coupled together to connect the two engaging members (43). The outer diameter of the first assembly base (41) is larger than that of the second assembly base (42), and the first assembly base (41) is movably limited in the first chamber (11), and the third spring (414) is abutted against the stop plate (13). Also, the second assembly base (42) is configured to protrude out of the shell (10), and the two engaging arms (431) are extended out of the shell (10). The end of the top column (23) of the locking rod (20) passes through the axial through hole (411) of the first assembly base (41) to extend into a position between the two engaging members (43). The movement of the locking rod (20) drives the two engaging arms (431) open or close so as to engaging or disengaging with an electronic device, thereby achieving the lock and unlock effects.

In one embodiment, a guiding slope (311) is formed on the outward-facing surface of the first engaging tooth (31) while a push slope (416) is formed on the inward-facing surface of the second engaging tooth (415). When the locking member (40) retracts, the push slope (416) of the second engaging tooth (415) is adapted to push the guiding slope (311) of the first engaging tooth (31), so as to push the positioning member (30) to tilt downward.

In another embodiment, a positioning pin (417) is formed on one end of the first assembly base (41), and a positioning hole (423) axially penetrate through the second assembly base (42), so that by aligning the positioning hole (423) with the positioning pin (417), the first assembly base (41) and the second assembly base (42) are accurately fitted together.

In still another embodiment, each of the engaging arms (431) has a recess (432), and the two recess (432) on the engaging arms (431) are located at symmetrical positions, and an elastic ring (433) is disposed on the recesses (432), so that the engaging arms (431) of the engaging members (43) are constrained by the elastic ring (433) to move toward each other in normal state.

In a further embodiment, the diameter of the top column (23) is gradually expanded from the front end to form a first diameter segment (231), a second diameter segment (232), and a third diameter segment (233), and each of the engaging members (43) has a driving protrude (434) at the inner edge of the end opposite to the engaging arm (431), and the open distance between the two engaging arms (431) is adjusted by moving the driving protrudes (434) on different surfaces of the first diameter segment (231), the second diameter segment (232), and the third diameter segment (233).

Figure 4:
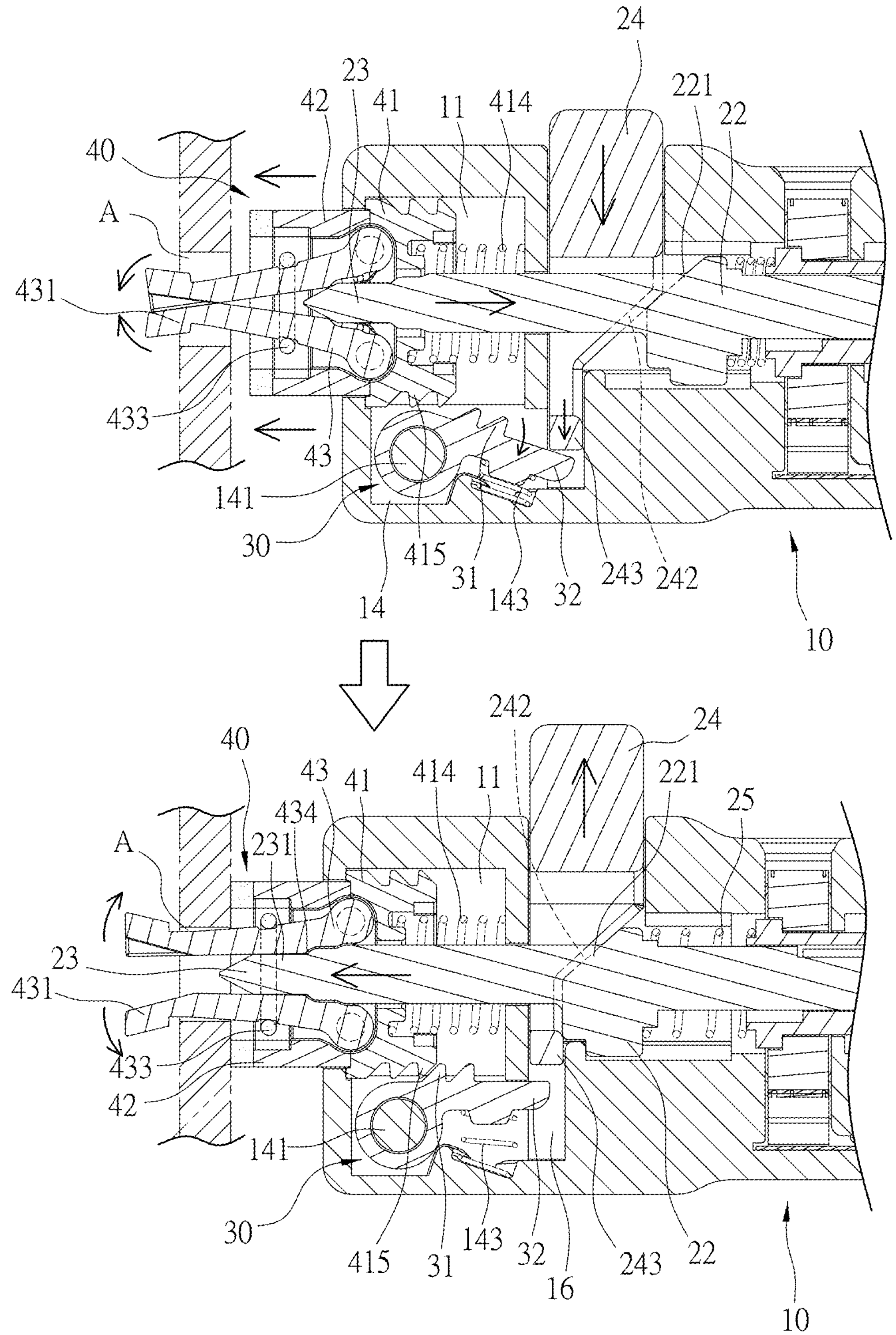
FIG. 4 is an operating schematic view illustrating the combination lock for electronic product of the present invention is applied to a small-sized lock hole on an electronic device.

Structurally, referring to FIGS. 3 and 4, when the control button (24) is not pressed to drive the locking rod (24), the preset second spring (25) at the rear end of the trigger block (22) is configured to normally push the locking rod (20) forward, so that the front end of the top column (23) is adapted to extend between the two engaging members (43) and pass through the elastic ring (433), so as to force the two engaging arms (431) apart outwardly, thereby forming the locked state. Also, the pressing slope (242) of the control button (24) is abutted against the trigger slope (221) of the trigger block (22), and the first pressing portion (243) is adapted to make contact with the front end of the trigger block (22). When the combination lock of the present invention needs to secure an electronic device, the user first presses down the control button (24) to move the pressing slope (242) along the trigger slope (221) so as to push the trigger block (22) backward. While, the locking rod (20) is retracted to retract the top column (23) away from the elastic ring (433), so that the engaging arms (431) of the engaging members (43) are tightened and drawn to each other by the elastic ring (433). As a result, the engaging arms (431) are inserted into a preset first lock hole (A) of the electronic device, and by releasing the control button (24), the locking rod (20) is pushed back into place by the rebound force of the second spring (25), and the top column (23) is moved back to the position between the two engaging members (43), thereby forcing the two engaging arms (431) to open outward. Thus, the two engaging arms (431) are adapted to engage and secure with the first lock hole (A) so as to achieve the locking effect. Additionally, the other end of the shell (10) is connected to a cable (18), which is configured to be fastened to a fixed object such as a table, thereby preventing the electronic device from being stolen and achieving the anti-theft function.

The above example is applied to small-sized first lock hole (A). In this case, the locking member (40) is pushed by the third spring (414), and the front end of the first chamber (11) is abutted against by the first assembly base (41) to secure the position of the locking member (40). Also, the second engaging teeth (415) on the outer periphery of the first assembly base (41) make no contact with the first engaging teeth (31) of the positioning member (30), and meanwhile the two driving protrudes (434) of the engaging members (43) are abutted against the first diameter segment (231) of the top column (23), and the open distance between the two engaging arms (431) is equal to the diameter of the first diameter segment (231), so as to applied the combination lock to the small-sized first lock hole (A).

Figure 5:
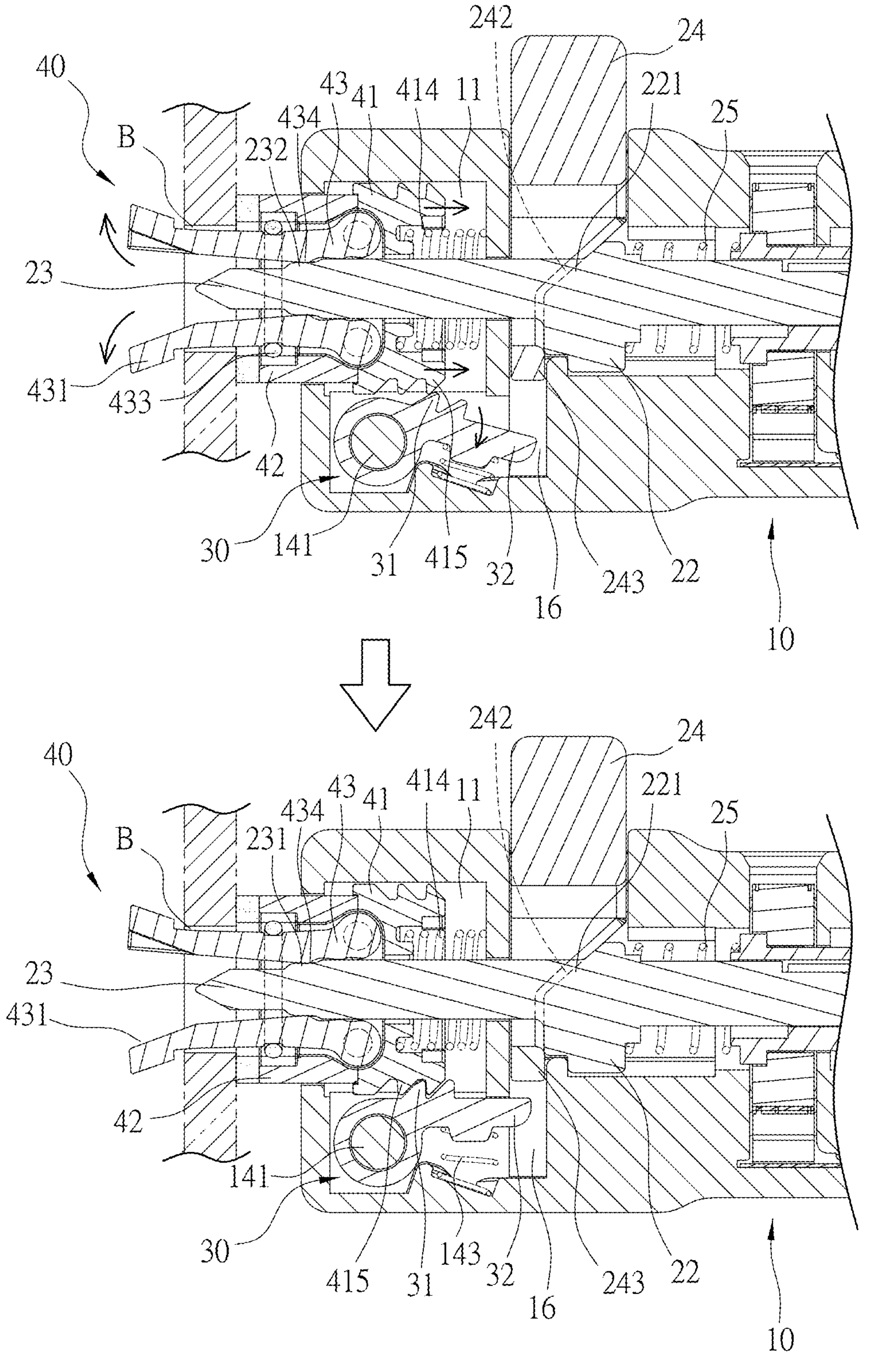
FIG. 5 is an operating schematic view illustrating the combination lock for electronic product of the present invention is applied to a medium-sized lock hole on an electronic device.

In another application for medium-sized holes, referring to FIGS. 2 and 5, in case that the second lock hole (B) of an electronic device is larger than the open distance of the two engaging arms (431) driven by the first diameter segment (231) of the top column (23), after the engaging arms (431) of the locking member (40) are inserted into the second lock hole (B), the second assembly base (42), which is exposed outside the shell (10), is pressed against the outer wall of the electronic device. Then, the first assembly base (41) is retracted inward, and the second engaging teeth (415) are adapted to push the first engaging teeth (31) of the positioning member (30). Moreover, the push slope (416) is abutted against the trigger slope (221) to swing the positioning member (30) downward. When the first assembly base (41) is retracted by a distance equal to the wide of the second engaging tooth (415), the positioning member (30) is pushed by the first spring (143) to swing back into its original position. In addition, the first engaging tooth (31) is engaged with one of the second engaging tooth (415) of the first assembly base (41) so as to secure the positions thereof. Meanwhile, the retraction of the locking member (40) simultaneously adjusts the contact depth between the two engaging members (43) and the top column (23), so that the driving protrudes (434) of the two engaging members (43) are shifted from the first diameter segment (231) to couple with the second diameter segment (232). The open distance between the two engaging arms (431) is defined and adjusted by the diameter of the second diameter segment (232), so as to apply the present invention of the combination lock to the medium-sized second lock hole (B).

Figure 6:
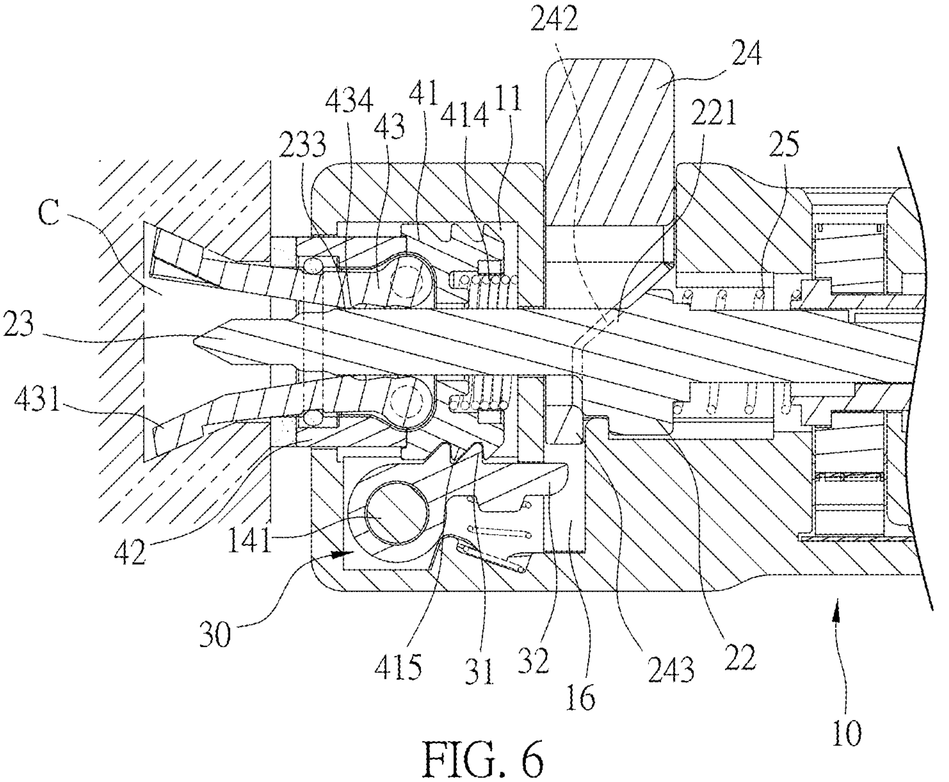
FIG. 6 is an operating schematic view illustrating the combination lock for electronic product of the present invention is applied to a large-sized lock hole on an electronic device.

Furthermore, referring to FIG. 6, in further another application for large-sized holes, in case that the present invention is applied to the third lock hole (C) of an electronic device, after the engaging arms (431) of the locking member (40) are inserted into the third lock hole (C), the second assembly base (42), which is exposed outside the shell (10), is pressed against the outer wall of the electronic device. Then, the first assembly base (41) is retracted inward, and the second engaging teeth (415) are adapted to push the first engaging teeth (31) of the positioning member (30). When the first assembly base (41) is retracted by another distance equal to the wide of the second engaging tooth (415), the positioning member (30) is pushed again by the first spring (143) to swing back into its original position. In addition, the first engaging tooth (31) is engaged with one of the second engaging tooth (415) of the first assembly base (41) so as to secure the positions thereof. Meanwhile, the further retraction of the locking member (40) simultaneously adjusts the increased contact depth between the two engaging members (43) and the top column (23), so that the driving protrudes (434) of the two engaging members (43) are shifted from the second diameter segment (232) to couple with the third diameter segment (233). The open distance between the two engaging arms (431) is defined and adjusted by the diameter of the third diameter segment (233), so as to apply the present invention of the combination lock to the large-sized third lock hole (C).

Figure 7:
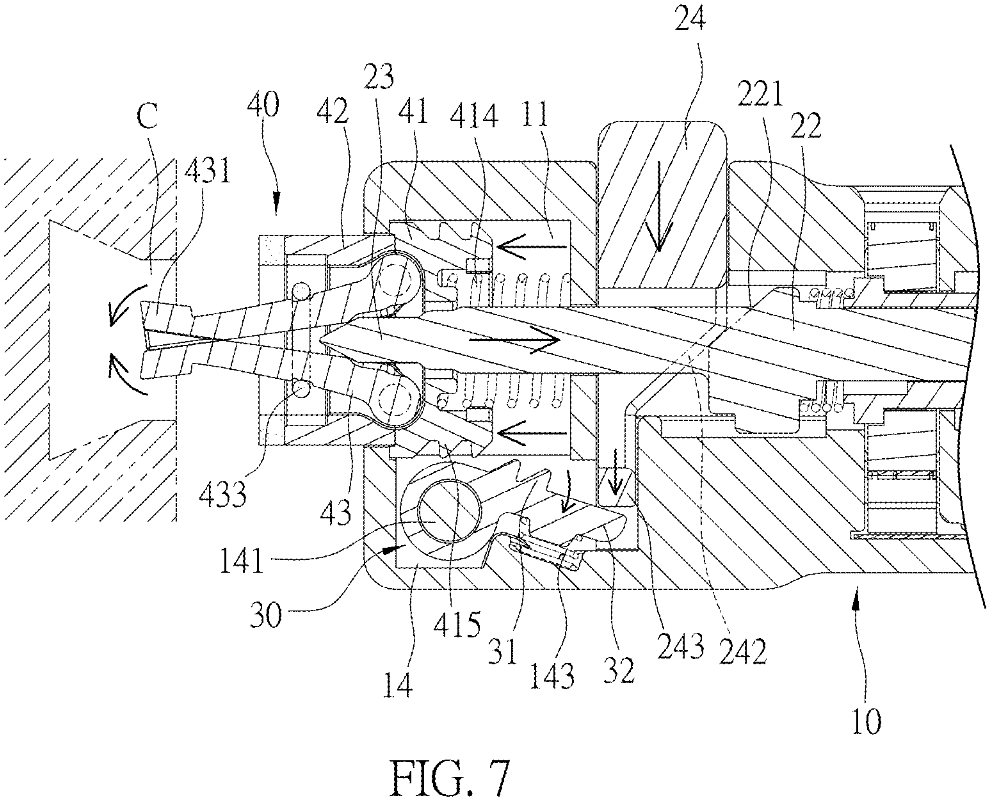
FIG. 7 is a schematic view illustrating the combination lock for electronic product of the present invention is unlocked.

In the unlocking process of the combination lock of present invention, as shown in FIG. 7, the user presses down on the control button (24), and the pressing slope (242) is moved along the trigger slope (221) to push the trigger block (22) backward. Then, the locking rod (20) is retracted inwardly, and the front end of the top column (23) is retracted away from the elastic ring (433), so that the two engaging arms (431) of the engaging members (43) are tightened and drawn to each other by the elastic ring (433). As a result, the lock is released, and the two engaging arms (431) is adapted to be pulled out from the lock hole, completing the unlocking process. Additionally, when the locking member (40) is retracted to adjust for different lock hole sizes, the control button (24) is pressed down to drive the first pressing portion (243) downward so as to simultaneously press down the second pressing portion (32) of the positioning member (30). Also, the positing member (30) swings downward, and the first engaging teeth (31) of the positioning member (30) are disengaged from the second engaging teeth (415) of the first assembly base (41), so as to disengage the first assembly base (41) from the positioning member (30). Moreover, the other end of the locking member (40) is normally pushed by the third spring (414), so that when the positioning member (30) is released by pressing the control button (24), the locking member (40) is pushed bac to its original position by the third spring (414), and the two engaging members (43) of the locking member (40) are adapted to return to non-retracted state, resetting to the locking position applied to small-sized lock holes.

Figure 8:
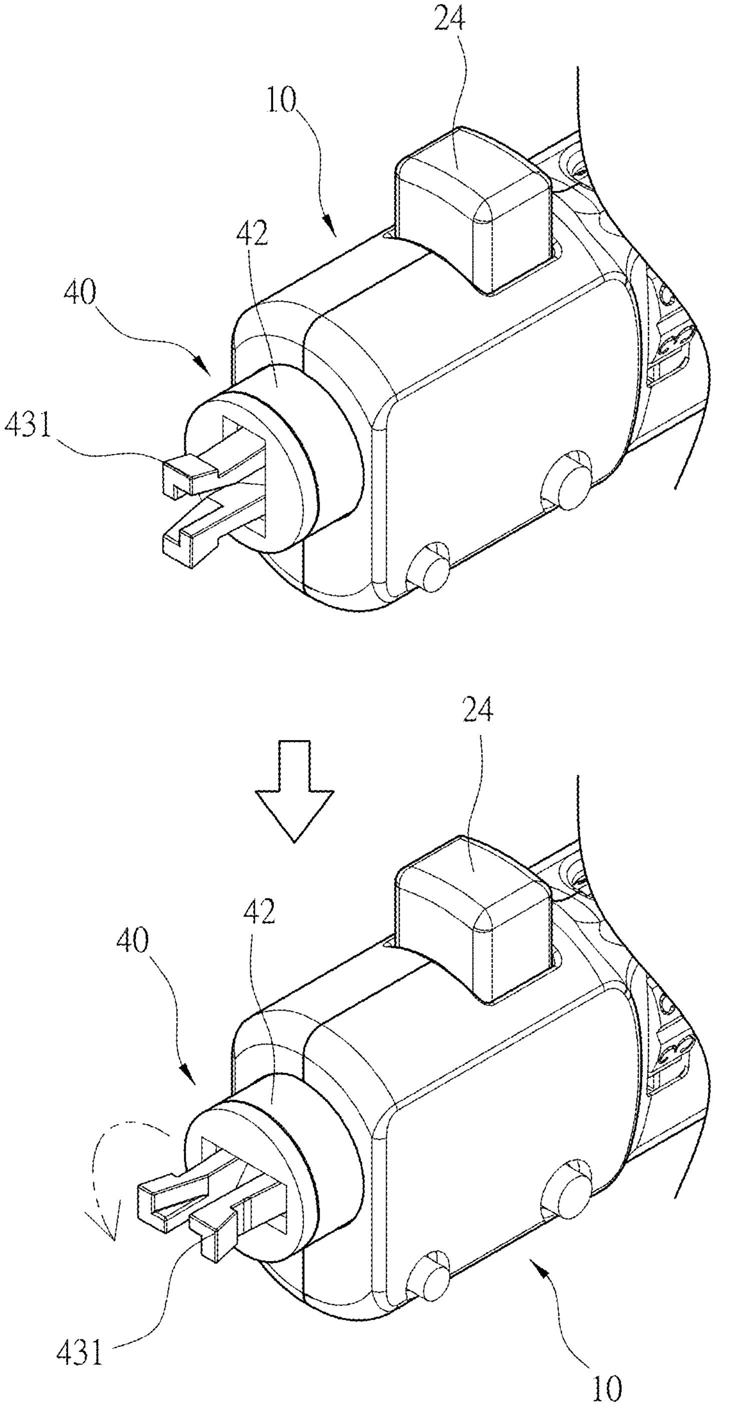
FIG. 8 is a schematic view illustrating a locking member of the combination lock is rotatable.

In one embodiment, the first chamber (11) of the shell (10) is a cylindrical chamber, and both of the first assembly base (41) and the second assembly base (42) are formed in cylindrical shapes, corresponding to the shape of the first chamber (11), so that the locking member (40) is configured to rotate freely within the first chamber (11). Referring to FIG. 8, the angle of the two engaging arms (431) is adjustable, so as to make the combination lock of the present invention adaptable to lock holes at various angles and prevent the cable from twisting or tangling.

Comparing with conventional combination lock for electronic product, the present invention is advantageous because: (i) the retractable locking member (40) allows the two engaging members (43) to be moved inward so as to adjust the contact depth with the top column (23) and the open distance between the two engaging arms (431), and after the locking member (40) moves inward, the second engaging teeth (415) are engaged with the first engaging teeth (31) of the positioning member (30), thereby preventing the locking member (40) springing back and ensuring that the opening distance of the two engaging arms (431) remains secure, and further providing a clear indication of the adjustment state of the locking member (40); and (ii) the locking member (40) is equipped with at least two second engaging teeth (415) on the outer periphery thereof, corresponding to at least two first engaging teeth (31) on the positioning member (30), allowing for at least three distinct adjustment settings, which makes the combination lock of the present invention to apply to a wide variety of hole sizes of different electronic devices, significantly enhancing its structural practicality and convenience.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A combination lock for electronic product comprising a shell, a locking rod, a positioning member, and a locking member;

wherein the shell is formed by combining two symmetrically arranged parts;

wherein the locking rod movably inserted within the shell, sequentially comprises a trigger block and a top column at one end thereof, and the locking rod axially penetrate through the shell to couple a control button in the shell, and the trigger block is abutted against and driven by the control button so as to move the locking rod;

wherein the positioning member pivotally mounted within the shell to swing comprises at least two first engaging teeth on the upper surface of the positioning member, and the lower surface of the positioning member is abutted against and pushed upwardly by a first spring to form a locked state of the positioning member in normally, and the positioning member is released and into an unlocked state by the control button;

wherein the locking member movably installed in the shell has two symmetrical engaging members pivotally connected at one end of the locking member, and each of the two engaging member comprises an engaging arm extending from one end of the engaging member out of the shell; the other ends of the two engaging members are driven by the locking rod to open/close the two engaging arms, thereby locking or unlocking an electronic device; each of the engaging arms has a recess, and the two recess on the engaging arms are located at symmetrical positions, and an elastic ring is disposed on the recesses, and at least two second engaging teeth are formed on the outer periphery of the locking member, and when the locking member is retracted toward the shell, the first engaging teeth of the positioning member are engaged with the second engaging teeth so as to adjust contact depth between the two engaging members and the top column, thereby achieving the adjustment of open distance of the two engaging arms; the other end of the locking member is normally pushed by a third spring, and when the positioning member is set to a released state through the control button, the locking member is adapted to be pushed back into its original position by the force of the third spring; and wherein when the control button is pressed down, a pressing slope of the control button pushes the trigger block backward, the locking rod is retracted inwardly, and the front end of the top column is retracted away from the elastic ring, so that the two engaging arms of the engaging members are tightened and drawn to each other by the elastic ring to release the combination lock, and the two engaging arms is adapted to be pulled out from lock holes to unlock the electronic device.

2. The combination lock for electronic product of claim 1, wherein the shell comprises a first chamber and a second chamber located adjacent to one end of the shell, and the first chamber has one open end communicated with external environment, and a stop plate is formed at the other end of the first chamber; the stop plate has a first through hole on the center thereof, and one lateral side of the first chamber comprises an accommodating slot which is communicated with the first chamber, and the second chamber has a second through hole at one side thereof to penetrate through the shell, and the second through hole and the accommodating slot are located on opposite sides of the shell; a lower channel formed between the front end of the second chamber and the stop plate is adapted to connect and communicate the second chamber with the accommodating slot.

3. The combination lock for electronic product of claim 2, wherein a plurality of number wheels are disposed on the locking rod, and the axial movement of the locking rod is controlled by the number wheels, and the shell has a plurality third through holes to allow partial of the number wheels at corresponding positions to be exposed; the trigger block is slidably accommodated within the second chamber, and the top column passes through the first through hole and the first chamber to penetrate out of the shell; the trigger block comprises a trigger slope, and the control button has the pressing slope and a first pressing portion is extended from the bottom end of the pressing slope; the control button is assembled through the second through hole of the shell into the second chamber; the pressing slope is configured to abut against and push the trigger slope of the trigger block, and the first pressing portion is moved along the lower channel into the accommodating slot; and a first elongated hole axially penetrates through the control button to allow the top column to pass through the control button.

4. The combination lock for electronic product of claim 3, wherein the positioning member is assembled in the accommodating slot, and the accommodating slot has an axial pin pivotally connected to the positioning member; an inclined slot is formed on the lower surface of the accommodating slot to secure a first spring, and the first spring is adapted to abut and push against the lower surface of the positioning member, so that the first engaging teeth on the upper surface of the positioning member are normally extend upward into the first chamber and are abutted against the bottom end of the stop plate to secure the position thereof; and a second pressing portion formed at the other end of the positioning member protrudes within the lower channel.

5. The combination lock for electronic product of claim 4, wherein the locking member has a first assembly base and a second assembly base, and the first assembly base has an axial through hole penetrating therethrough, and taking the axial through hole as the center, the first assembly base comprises two first pivot slots at one side of the center, and a peripheral groove at the other side of the first assembly base to receive and secure one end of a third spring, and the other end of the third spring is abutted against the stop plate; the second engaging teeth are formed on the outer periphery of the first assembly base; the second assembly base comprises a second elongated hole axially penetrating therethrough, and two second pivot slots are formed at one end of the second assembly base at the positions corresponding to the two first pivot slots; the engaging arms are adapted to penetrate through and out of the second elongated hole of the second assembly base, and the two second pivots slots and the two first pivot slots are aligned and coupled together to connect the two engaging members; and the outer diameter of the first assembly base is larger than that of the second assembly base, and the first assembly base is limited in the first chamber, and the second assembly base is configured to protrude out of the shell.

6. The combination lock for electronic product of claim 5, wherein a positioning pin is formed on one end of the first assembly base, and a positioning hole axially penetrate through the second assembly base, so that by aligning the positioning hole with the positioning pin, the first assembly base and the second assembly base are accurately fitted together.

7. The combination lock for electronic product of claim 1, wherein the engaging arms of the engaging members are constrained by the elastic ring to move toward each other in normal state.

8. The combination lock for electronic product of claim 1, wherein the diameter of the top column is gradually expanded from the front end to form a first diameter segment, a second diameter segment, and a third diameter segment, and each of the engaging members has a driving protrude at the inner edge of the end opposite to the engaging arm, and the open distance between the two engaging arms is adjusted by moving the driving protrudes on different surfaces of the first diameter segment, the second diameter segment, and the third diameter segment.

9. The combination lock for electronic product of claim 1, wherein a guiding slope is formed on the outward-facing surface of the first engaging tooth while a push slope is formed on the inward-facing surface of the second engaging tooth; and when the locking member retracts, the push slope of the second engaging tooth is adapted to push the guiding slope of the first engaging tooth, so as to push the positioning member to tilt downward.

* * * * *